United States Patent Office 3,432,536
Patented Mar. 11, 1969

3,432,536
ORGANOPOLYSILOXANE FLUIDS SUBSTITUTED WITH METHYLOLATED AMIDOALKYL GROUPS
Edward T. Simoneau, Schenectady, N.Y., assignor to General Electric Company, a corporation of New York
No Drawing. Filed May 27, 1965, Ser. No. 459,449
U.S. Cl. 260—448.2
Int. Cl. C07f 7/10
6 Claims

ABSTRACT OF THE DISCLOSURE

Organopolysiloxane fluids which are substituted with methylolated amidoalkyl groups are made by treating an amidoalkyl substituted polysiloxane fluid with formaldehyde. Textiles treated with a methylolated amidoalkyl polysiloxane are water repellent and have improved hand.

---

Organopolysiloxanes

This application relates to derivatives of organosilicon materials substituted with amidoalkyl groups. More particularly, this application relates to organopolysiloxane fluids which are substituted with methylolated amidoalkyl groups and to the uses of these polysiloxanes.

One area in which organopolysiloxanes have received extensive use is in textile treatments. For example, organopolysiloxanes have been utilized for water repellency, softening, dimensional stability, flame resistance, and crease resistance, among others. These organopolysiloxane materials are used with cotton and other cellulosic materials, but are bonded either around the cellulose fibers, or through an —SiOC— group which is hydrolytically unstable, so that the organopolysiloxane is removed during laundering. These problems are also present, to a degree, in the use of the previously known organopolysiloxanes for paper treatment, such as when paper is treated to allow release from adhesive substances.

It has now been unexpectedly discovered that by methylolating an amidoalkyl substituent on an organopolysiloxane, a material is formed which can be firmly bonded to cellulosic fibrous materials, both textiles and paper. The organopolysiloxanes of the present invention are those having the formula:

(1) 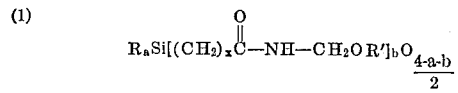
$$\frac{R_aSi[(CH_2)_xC(=O)-NH-CH_2OR']_bO_{4-a-b}}{2}$$

where R is a monovalent radical selected from the class consisting of hydrocarbons, halogenated hydrocarbons, and cyanoalkyls, R' is selected from the class consisting of hydrogen, methyl and ethyl, at least a majority of the R' groups being hydrogen, $a$ is from 1.5 to 2.0, $b$ is from 0.02 to 1.0, and $x$ is from 2 to 18. Preferably, at least 75% of the R' groups are hydrogen. Thus, within the scope of the present invention are compounds containing monofunctional, difunctional, and trifunctional siloxy components, any of which can be substituted with the methylolated amidoalkyl group. It should, of course, be understood that the hydrocarbon radicals represented by R can be substituted with other functional groups such as: alkoxy, aryloxy, hydroxy, and carboxy.

The materials of the present invention are susceptible to a wide variety of uses. For example, the methylolated amide group can be the reactive functionality in curing bulk films, as when a fluid of Formula 1 is treated with a catalyst and heated at the proper temperature, a continuous film is formed. Further, organopolysiloxanes can be bonded to metals to provide corrosion resistance through the methylolated group. Using an acidic catalyst, a material defined by Formula 1 can be bonded to either textiles or paper to provide water repellency, or, such a material can provide both water repellency and improved hand to cotton. The methylolated amide can be used for bonding a polysiloxane material to paper to provide release from adhesive substances.

Further, the methylolated amide group bonded to a silicon atom through an alkylene group is useful in preparing fabrics with wash and wear properties, particularly when the organopolysiloxane is of lower molecular weight, such as a bis(methylolated amidoalkyl)tetraalkyldisiloxane. Presently, most wash and wear fabrics are treated with urea-formaldehyde or melamine-formaldehyde type resins. By incorporating a polymer of the present invention, the hand of the fabric can be improved while not diminishing the wash and wear feature, or the organopolysiloxane can be used as a plasticizer for the above mentioned resins in other applications.

Among the hydrocarbon radicals which R represents are alkyl radicals having one to 12 carbon atoms, such as methyl, ethyl, propyl, butyl, octyl, dodecyl, isopropyl, isobutyl, etc.; cycloalkyl radicals having from 5 to 7 ring carbon atoms, such as cyclohexyl, cyclopentyl, cycloheptyl, etc.; mononuclear and binuclear aryl radicals, such as, phenyl, biphenyl, naphthyl, benzoylphenyl, paraphenoxyphenyl, tolyl, xylyl, etc.; mononuclear aralkyl radicals, such as benzyl, phenethyl, etc.; and alkenyl radicals having 2 to 12 carbon atoms, such as vinyl, allyl, etc. Halogenated derivatives of the above described monovalent hydrocarbon radicals represented by R include chloromethyl, dibromophenyl, trifluoromethylpropyl, trifluoromethylphenyl, etc. In addition, R represents cyanosubstituted lower alkyl radicals having fewer than 4 alkyl carbon atoms, such as cyanomethyl, α-cyanoethyl, β-cyanoethyl, β-cyanopropyl, γ-cyanopropyl, and cyanosubstituted mononuclear aryl radicals such as cyanophenyl, etc. The preferred polymers of the present invention are those where each R is a monovalent alkyl radical of from one to seven carbon atoms.

The methylolated amidoalkyl-substituted organopolysiloxanes are formed from the corresponding amidoalkyl-substituted materials which are known in the art. A number of routes are possible for formation of the amidoalkyl material. For example, bis(amidopropyl)tetramethyldisiloxane can be formed by the acid hydrolysis, at an elevated temperature, of cyanopropyl dimethylchlorosilane according to the equation:

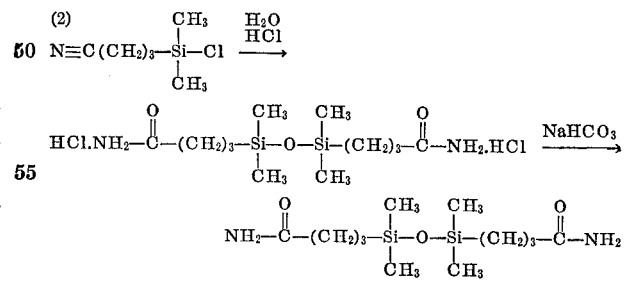

The hydrolysis should be conducted at 40°–60° C. by the addition of the silane to a 37% hydrochloric acid solution. The silane can be added rapidly, the rate of addition being limited only by the maximum temperature of the reaction. Following addition, the mixture should be stirred for from two to ten hours to allow completion of the reaction. The disiloxane amide-hydrochloride is then neutralized with sodium bicarbonate to precipitate the solid amide.

Additionally, the amidoalkyl-substituted materials can be formed from carboxyalkyl-substituted materials, either by treatment with ammonia, followed by dehydration, or by treatment with thionyl chloride followed by ammonolysis. These reactions are represented below:

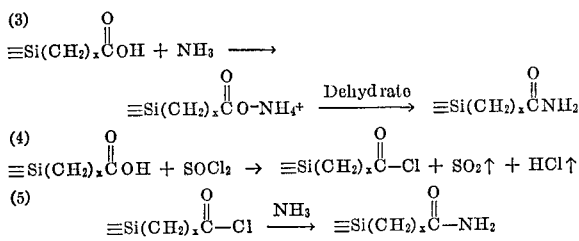

where $x$ is as previously defined. In Equation 3, the reaction with ammonia can be conducted at any temperature, preferably at room temperature, and the dehydration can be conducted at any temperature from about 230° to 250° C. The gaseous ammonia is added, in an excess of at least 200%, to the carboxyalkylsiloxane as fast as the solution will absorb it. Saturation is continued for an additional 30 to 45 minutes to complete the reaction. In Equation 4, the thionyl chloride is added to the carboxyalkylsiloxane at any temperature from room temperature up to about 60° C. and is added in an excess of at least 150%. The addition is conducted over a period of from 30 minutes to one hour and the reaction mixture is stirred for an additional 30 minutes to one hour to assure completion of the reaction. In Equation 4, the reaction byproducts, $SO_2$ and HCl, are evolved as gases during the course of the reaction. Ammonia is added to the reaction product of Equation 4, as shown in Equation 5, in an excess of at least 200%. The ammonolysis is conducted under the same conditions as previously described for Equation 3.

The methylolation of the amidoakylsiloxane, regardless of the method of preparation, is accomplished by treating the amidoalkyl compound with any of a variety of forms of formaldehyde, either in the presence of a basic catalyst, or without a catalyst, and preferably while the polysiloxane is dissolved in a solvent as represented in the following equation:

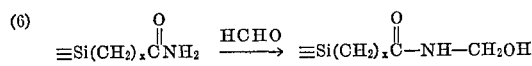

where $x$ is as previously defined. Among the forms of formaldehyde which can be used are the 37% water solution of formaldehyde, known as formalin, and polymeric formaldehydes, such as, paraformaldehyde or trioxymethylene. While the ratio of formaldehyde to amide groups can be in the stoichiometric ratio of 1:1, it is preferred to have at least a 50% excess of formaldehyde and as much as a 100% excess can be profitably employed.

A solvent is generally preferred for this reaction because of the high viscosity of the amidoalkylsiloxane. Generally, it is preferred to employ as solvents organic materials which are inert to the reactants under the conditions of reaction. However, in some cases it is desirable to etherify a portion of the methylol group and reactive solvents are then employed. Among the inert solvents are the hydrocarbons, such as benzene, toluene, xylene, pentane, hexane, heptane, etc. Oxygenated hydrocarbons, such as ethers and ketones, can also be employed. The amount of solvent to be employed is not critical and is limited only by the economics of later recovery. Generally, a ratio of solvent to polysiloxane of 1:1, by weight, is preferred. In those cases where it is desirable to partially etherify the methylol group, the methylolation is conducted in the presence of either methanol or ethanol. A portion of the methylol groups, following formation on the amide, are then etherified by the alcoholic solvent to form $-CH_2OZ$ groups where Z is selected from the class consisting of methyl and ethyl. Other conditions of reaction are the same as those described for the methylolation run in the presence of an inert solvent.

Any inorganic basic catalyst can be utilized for the methylolation. Preferably, the catalyst is present in an amount less than 0.5%, by weight, based on the polysiloxane, and more preferably less than about 0.3%, by weight. Among the catalysts which can be employed are such materials as sodium hydroxide, sodium carbonate, and potassium hydroxide. In general, materials such as sodium carbonate, which are less basic than the materials just mentioned, are to be preferred since with stronger bases there is the possibility of rearrangement of the siloxane bonds in the polymer.

The order of addition of the various reactants is immaterial and the reaction can be conducted at any temperature from ambient to the reflux temperature of the reaction mixture. A solution of all the materials involved in the reaction can be formed and heating begun, or a solvent solution of the amidoalkylsiloxane can be formed, the catalyst added, heating begun, and the formaldehyde added subsequently.

Following formation of the methylolated amides, cure is accomplished by condensation caused by heating in the presence of an acid catalyst. Two routes of condensation are possible as represented by the following equation:

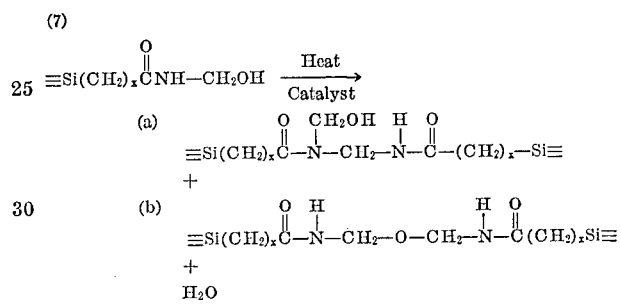

where $x$ is as previously defined. While I do not wish to be bound by theroy, it is probable that materials of both structures (a) and (b) result from the acid catalyzed condensation of the methylolated amides of the present invention. The partially etherified materials cure in a similar manner.

When the compounds of Formula 1 are used to treat cellulosic materials, it is probable that the organopolysiloxanes are bonded to the cellulose through an ether linkage formed with the hydroxyl groups of the cellulose according to the following representation:

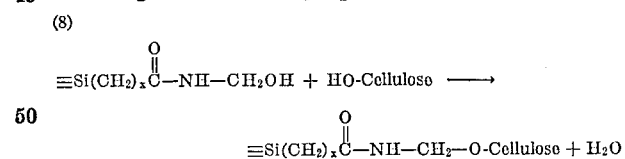

where $x$ is as previously defined.

The acid catalyst which is utilized, either for the condensation of two methylolated amide groups, or for the condensation of the methylolated amide group with a cellulosic hydroxyl radical, can be selected either from direct acid catalysts or from latent, or triggerable, acid catalysts. The direct acid catalysts, that is, those which are immediately available for catalysis, regardless of the temperature, include inorganic acids such as sulfuric acid, nitric acid, and hydrochloric acid; organic acids, such as, lactic acid and tartaric acid; and acid salts, e.g., sodium bisulfate and acid alkyl phosphates. In general, the stronger inorganic acids are not used with cellulosic materials since these acids may cause hydrolysis of the cellulose. The latent acid catalysts include such materials as potassium nitrate, magnesium chloride, ammonium salts, dimethyl oxalate, tertiary amine hydrochlorides, sodium sulfite, and the sodium and barium salts of ethyl sulfuric acid. In general, these latent acid catalysts are "triggered" by heating to about 150° C. Thus, when it is desired to make a solution (a term which should be understood to include emulsions) containing the methylolated amidoalkylpolysiloxane and a catalyst, which can be stored for a period of time, one of the latent acid catalysts can be utilized and the condensation later accomplished by heating the mixture to about 150° C.

In general, from about 0.5 to 10 percent, by weight based on the organopolysiloxane, of an acid catalyst should be present in the solution. Preferably, the catalyst should be present in an amount of from about 3% to 5% by weight. However, in the case of strong acid catalysts, such as, sulfuric acid or nitric acid, less than 3% by weight is preferred, generally about 1%. With the strong acid catalysts, cure can be accomplished at room temperature. With the other catalytic materials, the methylolated amidoalkylpolysiloxane and the catalyst are mixed, in the presence of a solvent if desired, and heating begun in the presence of the material to be treated. The length of time required for a complete cure is dependent upon the temperature employed. Curing can be accomplished at any temperature from ambient to a maximum of about 200° C. For example, in thin films, cure is accomplished in about 4 to 5 minutes at 150° C. when utilizing a catalyst such as a tertiary amine hydrochloride, potassium nitrate, or magnesium chloride. On the other hand, when the mixture is heated at about 50° C., curing may require as long as 24 hours.

To allow those skilled in the art to have a better understanding of the present invention, specific examples of the preparation and use of the materials of the present invention will now be given. These examples should be considered as illustrative only, and not as limiting in any way of the full scope of the invention as covered in the appended claims.

EXAMPLE 1

A quantity of 300 parts of γ-cyanopropyldimethylchlorosilane was added to 1500 parts of a 37% solution of hydrochloric acid over a period of about 30 minutes. During the resultant hydrolysis, the temperature was maintained under 20° C. After the addition was completed, the temperature of the reaction mixture was raised to 50° C. and held there for a period of two hours to convert the cyano groups on the bis(γ-cyanopropyl)tetramethyldisiloxane to soluble amide-hydrochloride groups. The reaction mixture was then cooled to room temperature and a 60% sodium bicarbonate slurry was slowly added to neutralize the hydrogen chloride. In the neutralization, the amide-hydrochloride was converted to the insoluble amide which precipitated from the solution and was recovered by filtration on a Buchner funnel. The amide was washed several times with cold water to remove impurities and was then allowed to dry at room temperature. A quantity of 270 parts was recovered. A solution composed of 50 parts of the amide in 50 parts of methanol was heated to 60° C. A quantity of 50 parts of formalin was added to the amide solution over a period of 15 minutes and the reaction mixture was refluxed at 80° C. for a period of two hours. Following reflux, the material was stripped to a concentration of 70% solids and cooled to room temperature, resulting in a clear, viscous material which was soluble in methanol. An infrared spectrum of the product, stripped to dryness and representing a quantity of 55 parts, showed the product to have the formula:

(9) 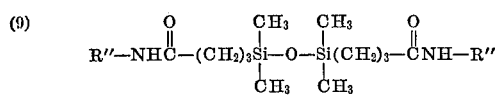

where R″ was approximately 80% —CH₂OH and 20% —CH₂O—CH₃. Thus, the silicon substituents, in addition to the methyl groups, were of the formula:

(10) 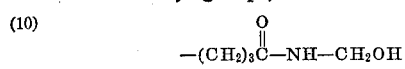

and

(11) 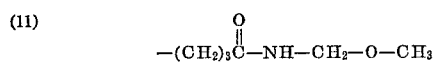

This corresponds to Formula 1 where R is methyl, R' is hydrogen and methyl, $a$ is 2.0, $b$ is 1.0, and $x$ is 3.

EXAMPLE 2

A portion of a polydimethylsiloxane fluid chain-stopped with dimethylbutyroamidesiloxy groups were methylolated in this example. The fluid had the average formula:

(12) 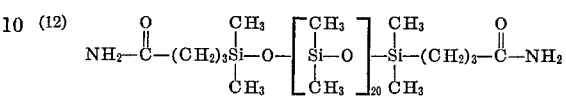

A quantity of 400 parts of this polysiloxane fluid was mixed with 35 parts of paraformaldehyde and 200 parts of toluene. The mixture was heated, with stirring, to 90°–95° C. for a period of two hours, after which it was cooled, filtered, and stripped of excess toluene. An infrared analysis of this final product, which consisted of 375 parts, substantiated the structure:

(13) 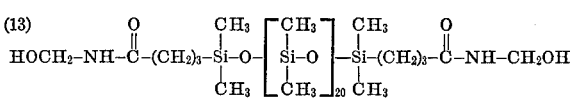

which corresponds to a fluid of Formula 1 where R is methyl, R' is hydrogen, $a$ is 2.0, $b$ is 0.09, and $x$ is 3.

EXAMPLE 3

In this example a polysiloxane fluid having the formula:

(14) 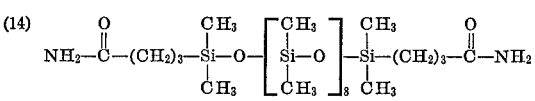

was methylolated. In a reaction vessel 400 parts of the fluid defined by Formula 14, 60 parts of paraformaldehyde, and 200 parts of toluene were blended. The mixture was heated, with agitation, at 90°–95° C. for a period of two hours. The mixture was then cooled, filtered, and the remaining toluene was stripped from the mixture, resulting in 408 parts of a fluid. An infrared spectrum of this fluid substantiated the structure:

(15) 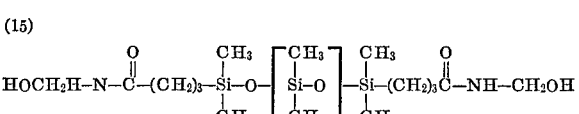

which corresponds to Formula 1 where R is methyl, R' is hydrogen, $a$ is 2, $b$ is 0.2, and $x$ is 3.

EXAMPLE 4

A polysiloxane fluid is prepared having the average structure:

(16) 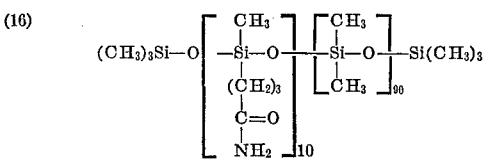

A quantity of 500 parts of this fluid is blended with 36 parts of paraformaldehyde and 300 parts of benzene. The mixture is heated, with agitation, at a temperature of 80°–85° C. for a period of about two hours. It is then cooled, filtered, and the benzene stripped from the fluid to yield a product having the average formula:

(17)
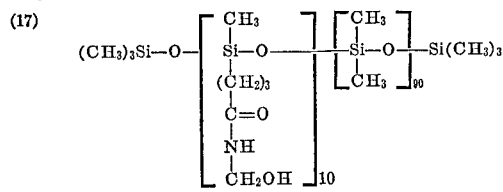

which corresponds to Formula 1 where R is methyl, R' is hydrogen, $a$ is 1.92, $b$ is 0.098, and $x$ is 3.

EXAMPLE 5

An amidoalkylpolysiloxane having the average formula:

(18)
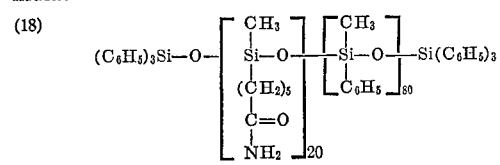

is prepared. A mixture is prepared containing 750 parts of the polysiloxane of Formula 18, 90 parts of formaldehyde, and 500 parts of methylethylketone. With stirring, the mixture is heated for about two hours at a temperature of 70°–75°. The reaction mixture is then cooled and filtered, and the excess solvent removed from the product by distillation, resulting in a fluid having the average formula:

(19)
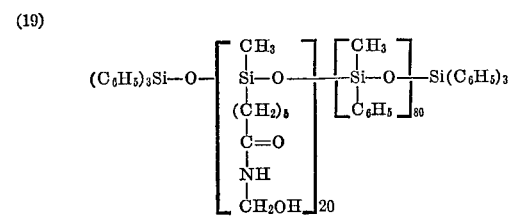

corresponding to Formula 1 where R is both methyl and phenyl, R' is hydrogen, $a$ is 1.82, $b$ is 0.196, and $x$ is 5.

EXAMPLE 6

An emulsion was prepared containing 10%, by weight, of the methylolated amidoalkypolysiloxane of Example 1. A quantity of zinc nitrate catalyst, equivalent to 10%, by weight, of the polysiloxane present in the emulsion was added, and a piece of 80 x 80 cotton was dipped into the catalyzed emulsion. The fabric was removed from the emulsion, padded at 80% wet pickup, and heated at 150° C. for 4 minutes to effect cure. The cotton was found to have a polysiloxane content, following cure, of approximately 8%. The cotton was then conditioned at 70% C. and 50% relative humidity for 24 hours. Recovery angles were determined and found to be 40–45% on untreated cotton, and 80–85% on the cotton treated with the methylolated amidoalkylpolysiloxane. The recovery angle of 80–85% is well within the range of wash and wear treatments.

EXAMPLE 7

A solution was prepared containing 3% of the methylolated amidoalkylpolysiloxane prepared in Example 2, 96.5% of methanol, 0.5% of a mixture of tertiary alkyl amine hydrochlorides, where the length of the alkyl groups was from 9 to 15. A piece of 80 x 80 cotton was treated with this solution for a 100% wet pickup and the cotton was then cured at 150° C. for 4 minutes. The cotton was tested for water repellency and found to have a spray rating of 90+. An improvement in hand was also noted. A similar solution was formed of the polysiloxane produced in Example 3. The cotton treated with the latter material showed, in addition to an improvement in hand, a spray rating of 80+.

EXAMPLE 8

A piece of glassine paper was treated with each of the solutions described in Example 7 by depositing a film of about 5 mils thickness on the surface of the paper. Each of the papers was cured for 30 seconds at 150° C. to complete bonding of the polysiloxane to the paper. When tested for release with both Johnson and Johnson surgical tape and the transparent tape of the 3M Company, an adhesion of less than 5 g./in. width was found.

EXAMPLE 9

Clean mild steel panels were coated with each of the solutions described in Example 7. The siloxane content of the coating was approximately 40 mg. per square foot. After curing the polysiloxane to the steel for 2 minutes at 150° C., the panels were submersed in water for a period of 24 hours. Superior corrosion resistance was noted as compared with an untreated panel.

While a 10% emulsion of the methylolated amidoalkyldisiloxane was used in Example 6 and 3% solutions of the longer chain methylolated amidoalkylpolysiloxanes in Examples 7 thru 9, it should be understood that usable solutions can be prepared with different concentration of the polysilioxanes. For example, to provide a wash and wear treatment, any concentration of at least 8% of the siloxane in water or solvent can be used. The maximum concentration is limited only by economics and a generally preferred solution contains from about 10% to 15% of the disiloxane. For other uses, such as treatment of paper for release or metal corrosion protection, solutions, including emulsions as previously noted, containing from 2% to 8% of the polysiloxane can be employed. The preferred concentration is from about 3% to 5%. Solvents which can be utilized for any of these solutions include aliphatics, such as, hexane, heptane, and cyclohexane, and aromatics, such as, benzene, xylene, and toluene, as well as such solvents as methylethylketone.

What I claim as new and desire to secure by Letters Patent of the United States is:

1. An organopolysiloxane fluid having the formula:

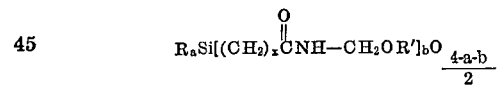

where R is selected from the class consisting of alkyl radicals having one to 12 carbon atoms, cycloalkyl radicals having from 5 to 7 ring carbon atoms, mononuclear and binuclear aryl radicals, mononuclear aralkyl radicals, alkenyl radicals having 2 to 12 carbon atoms, halogenated derivatives of the above described R radicals, cyano-substituted lower alkyl radicals, and cyano-substituted mononuclear aryl radicals; R' is selected from the class consisting of hydrogen, methyl, and ethyl, at least a majority of the R' groups being hydrogen, $a$ is from 1.5 to 2.0, $b$ is from 0.02 to 1.0, and $x$ is from 2 to 18.

2. The organopolysiloxane:

R″—NH—C(=O)—(CH₂)₃Si(CH₃)₂—O—Si(CH₃)₂(CH₂)₃C(=O)—NH—R″ where R″ is —CH₂OH and —CH₂—O—CH₃.

3. The organopolysiloxane:

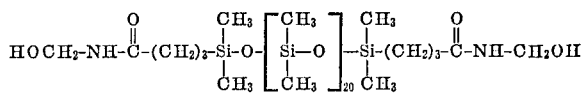

4. The organopolysiloxane:

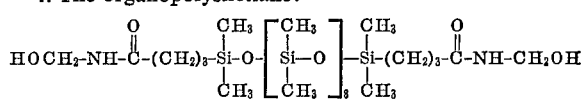

5. The organopolysiloxane:
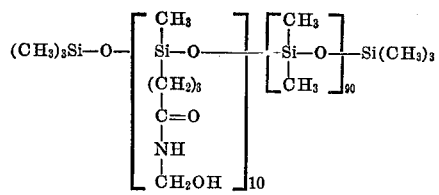
6. The organopolysiloxane:
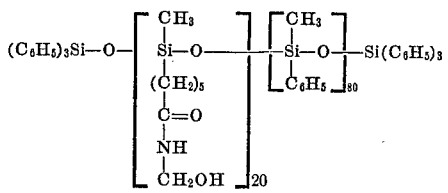
References Cited
UNITED STATES PATENTS
| | | |
|---|---|---|
| 2,415,017 | 1/1947 | MacKenzie. |
| 2,557,802 | 6/1951 | Sommer _____ 260—448.2 |
| 2,607,793 | 8/1952 | Sommer _____ 260—448.2 |
| 2,637,623 | 5/1953 | Janes. |
| 2,754,284 | 7/1956 | Speck _____ 260—448.2 |
| 2,838,423 | 6/1958 | Gilkey. |
| 2,855,381 | 10/1958 | Sommer _____ 260—448.2 XR |
| 2,929,829 | 3/1960 | Morehouse _____ 260—448.2 |
TOBIAS E. LEVOW, *Primary Examiner.*
PAUL F. SHAVER, *Assistant Examiner.*
U.S. Cl. X.R.
117—139.4, 135.1; 260—46.5